US012767451B2

(12) United States Patent
Ishibashi

(10) Patent No.: US 12,767,451 B2
(45) Date of Patent: Oct. 20, 2026

(54) SYSTEM AND METHOD FOR OPERATION MANAGEMENT OF CONVEYOR BELT

(71) Applicant: THE YOKOHAMA RUBBER CO., LTD., Hiratsuka (JP)

(72) Inventor: Yusuke Ishibashi, Hiratsuka (JP)

(73) Assignee: The Yokohama Rubber Co., Ltd., Kanagawa (JP)

( * ) Notice: Subject to any disclaimer, the term of this patent is extended or adjusted under 35 U.S.C. 154(b) by 101 days.

(21) Appl. No.: 18/863,059

(22) PCT Filed: Dec. 16, 2022

(86) PCT No.: PCT/JP2022/046524

§ 371 (c)(1),
(2) Date: Nov. 5, 2024

(87) PCT Pub. No.: WO2023/238425

PCT Pub. Date: Dec. 14, 2023

(65) Prior Publication Data

US 2025/0296785 A1 Sep. 25, 2025

(30) Foreign Application Priority Data

Jun. 7, 2022 (JP) ................................ 2022-092139

(51) Int. Cl.
*B65G 43/02* (2006.01)
*B65G 43/00* (2006.01)

(52) U.S. Cl.
CPC ...... *B65G 43/00* (2013.01); *B65G 2203/0291* (2013.01); *B65G 2203/046* (2013.01); *B65G 2811/095* (2013.01)

(58) Field of Classification Search
CPC ................................ B65G 43/00; B65G 43/02
(Continued)

(56) References Cited

U.S. PATENT DOCUMENTS 4,409,852 A 10/1983 Suzuki et al.
6,871,947 B2 * 3/2005 Kanemura ............ B41J 11/007 198/689.1

(Continued)

FOREIGN PATENT DOCUMENTS

JP S57-48521 A 3/1982
JP H11-334852 A 12/1999

(Continued)

*Primary Examiner* — Douglas A Hess
(74) *Attorney, Agent, or Firm* — Carrier, Shende & Associates P.C.; Joseph P. Carrier; Fulchand P. Shende

(57) ABSTRACT

A system and a method for operation management of a conveyor belt capable of accurately determining an operational state of the conveyor belt while having a simple configuration. A detector disposed at a predetermined detection position of a conveyor device transmits a transmission radio wave toward an IC tag of a passive type installed at a conveyor belt. A computation device calculates a running speed of the conveyor belt based on reception time when the detector receives a return radio wave returned from the IC tag in response to the transmission radio wave. An operational state of the conveyor belt is determined based on a change over time in the running speed. The computation device transmits data of the change over time in the running speed to a terminal device at a position away from an installation site of the calculation device through a communication network.

6 Claims, 9 Drawing Sheets

(58) Field of Classification Search
USPC .................................................... 198/502.4
See application file for complete search history.

(56) References Cited

U.S. PATENT DOCUMENTS

| | | | | |
|---|---|---|---|---|
| 7,624,857 | B2 * | 12/2009 | Kusel | B65G 43/02<br>198/810.02 |
| 7,894,934 | B2 * | 2/2011 | Wallace | B65G 43/00<br>198/341.01 |
| 8,657,105 | B2 * | 2/2014 | Twigger | B65G 43/02<br>198/810.01 |
| 9,207,252 | B2 * | 12/2015 | Hamada | G01P 3/68 |
| 9,440,799 | B1 * | 9/2016 | Wang | G08C 17/02 |
| 9,746,385 | B2 * | 8/2017 | Kar | G01H 11/08 |
| 10,023,397 | B1 * | 7/2018 | Brown | H04L 67/125 |
| 10,660,266 | B2 * | 5/2020 | Wallace | G01B 7/046 |
| 11,174,106 | B2 * | 11/2021 | San | B65G 43/02 |
| 12,253,460 | B2 * | 3/2025 | Canfield | G01N 21/29 |

FOREIGN PATENT DOCUMENTS

| | | | |
|---|---|---|---|
| JP | 2021-088456 | A | 6/2021 |
| JP | 2021-107260 | A | 7/2021 |
| JP | 2022-023840 | A | 2/2022 |
| WO | 2019/188718 | A1 | 10/2019 |

* cited by examiner

SYSTEM AND METHOD FOR OPERATION MANAGEMENT OF CONVEYOR BELT

TECHNICAL FIELD

The present invention relates to a system and a method for operation management of a conveyor belt and particularly relates to a system and a method for operation management of a conveyor belt that are capable of accurately determining an operational state of the conveyor belt while having a simple configuration.

BACKGROUND ART

Various proposed systems manage a conveyor belt that is mounted between pulleys of a conveyor device and runs (see, for example, Patent Document 1). A management system proposed in Patent Document 1 aims to improve traceability by acquiring specification information, maintenance information, and the like of a conveyor belt by using an RFID tag embedded in the conveyor belt. By using this management system, the use start date of the conveyor belt can also be clearly determined. This makes the replacement time of the conveyor belt clear and enables the conveyor belt to be replaced in a planned manner (paragraphs 0098 to 0103).

The operational conditions of conveyor belts are different in different sites of use. That is, in some sites, conveyor belts are used for a longer time and/or at a higher running speed than expected, and in other sites, conveyor belts are used for a shorter time and/or at a lower running speed than expected. Thus, if the service lives of conveyor belts having the same specification are uniformly set, there arises a problem in that each conveyor belt is not replaced at a period suitable for the site where the conveyor belt is used.

CITATION LIST

Patent Literature

Patent Document 1: JP 2022-23840 A

SUMMARY OF INVENTION

Technical Problem

That is, in a management system in the related art, it is not possible to sufficiently determine the actual operational condition of a conveyor belt on the site of use. In addition, in order to determine the operational conditions of conveyor belts at various sites of use, it is necessary to increase versatility by simplifying a configuration. Thus, there is room for improvement to accurately determine the operational state of a conveyor belt while having a simple configuration.

An object of the present invention is to provide a system and a method for operation management of a conveyor belt that are capable of accurately determining the operational state of the conveyor belt while having a simple configuration.

Solution to Problem

To achieve the object described above, a system for operation management of a conveyor belt according to an embodiment of the present invention includes: an IC tag of a passive type to be installed at a conveyor belt; a detector configured to wirelessly communicate with the IC tag without contacting the conveyor belt; and a computation device communicably connected to the detector. The detector receives a return radio wave returned from the IC tag installed at the conveyor belt mounted in a conveyor device in response to a transmission radio wave transmitted from the detector toward the IC tag. The computation device calculates a running speed of the conveyor belt based on reception time of the return radio wave by the detector disposed at at least one detection position of the conveyor device. An operational state of the conveyor belt is determined based on a change over time in the running speed calculated.

A method for operation management of a conveyor belt according to an embodiment of the present invention includes: installing an IC tag of a passive type at a conveyor belt; transmitting, without contacting the conveyor belt, a transmission radio wave from a detector toward the IC tag installed at the conveyor belt mounted in a conveyor device; and inputting, to a computation device, a reception result of a return radio wave by the detector, the return radio wave being returned from the IC tag in response to the transmission radio wave. The method includes disposing the detector at at least one detection position of the conveyor device, calculating, by the computation device, a running speed of the conveyor belt based on reception time of the return radio wave by the detector, and determining an operational state of the conveyor belt based on a change over time in the running speed calculated.

Advantageous Effects of Invention

An embodiment of the present invention may use an IC tag of a passive type to be installed at a conveyor belt, a detector wirelessly communicating with the IC tag without contacting the conveyor belt, and a computation device to which information detected by the detector is input. The IC tag may be a general-purpose product capable of returning a return radio wave to the detector in response to a transmission radio wave transmitted from the detector. This can simplify the entire configuration of an invention. The running speed of the conveyor belt is calculated by the computation device based on the reception time when the return radio wave is received by the detector disposed at at least one detection position of the conveyor device. The running speed reflects the actual operational condition of the conveyor belt, which is advantageous in accurate determination of the operational state of the conveyor belt based on a change over time in the running speed. Accordingly, the service life of the conveyor belt at each site of use can be estimated more accurately, which is advantageous in replacement of the conveyor belt at a period suitable for each site of use.

DESCRIPTION OF EMBODIMENTS

Figure 1:
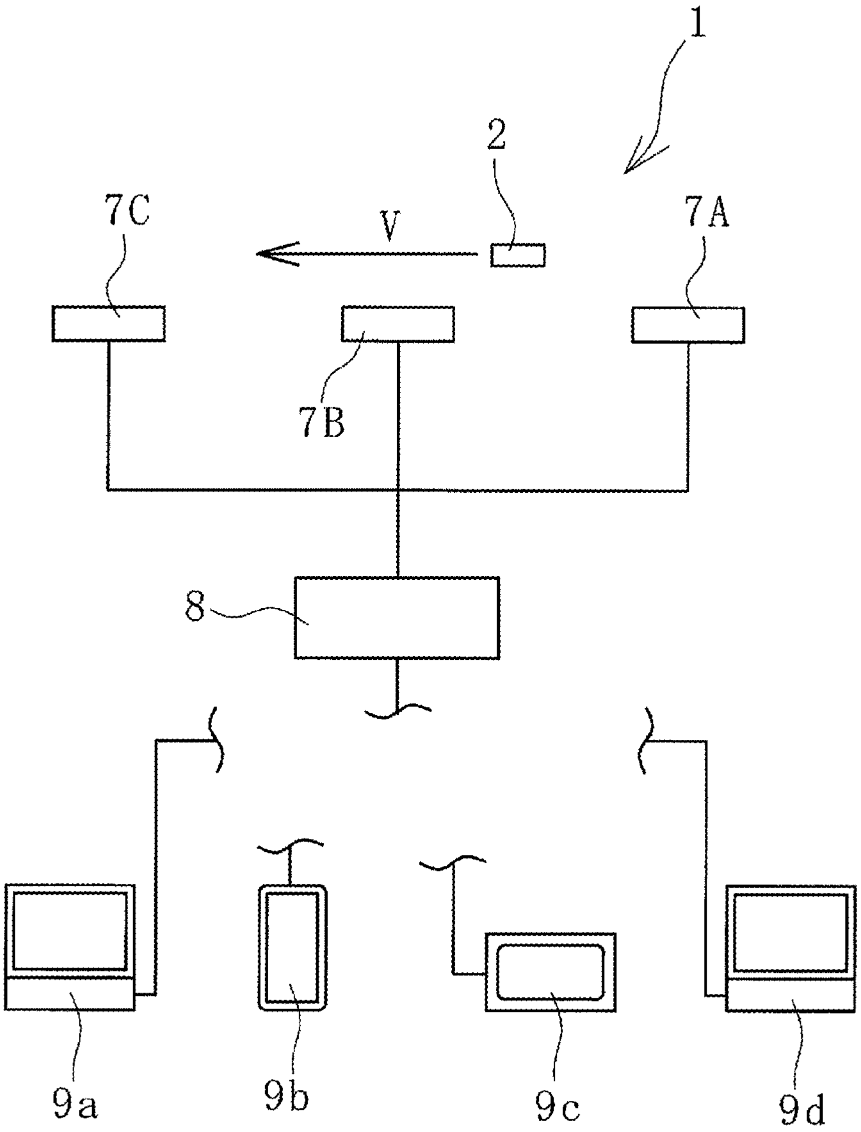
FIG. 1 is an explanatory diagram illustrating an entire outline of an embodiment of a system for operation management of a conveyor belt.
Figure 2:
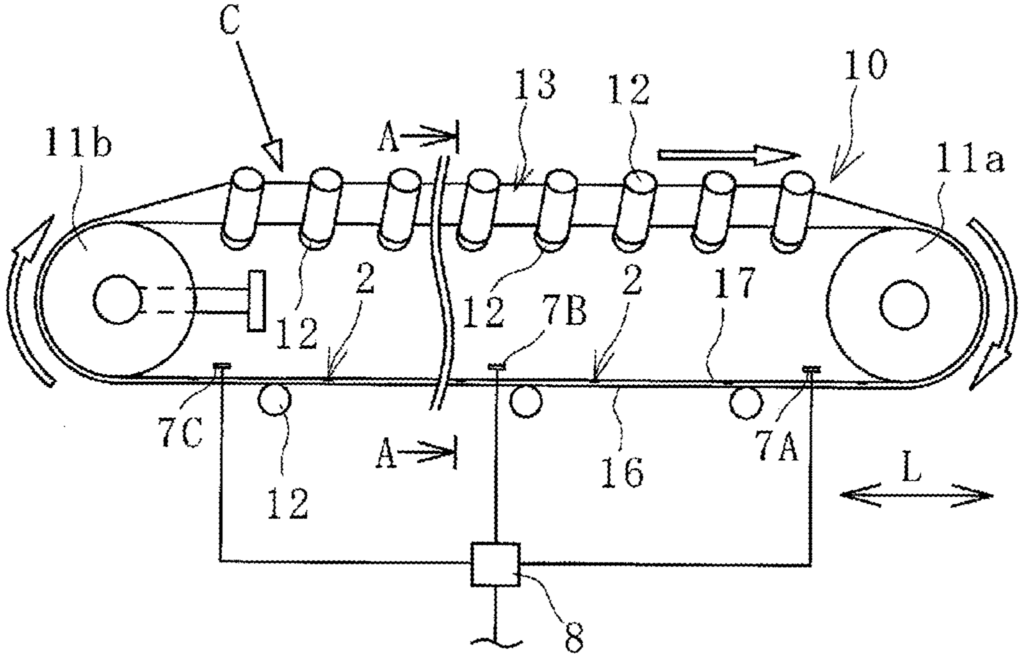
FIG. 2 is an explanatory diagram illustrating a conveyor device to which the system of FIG. 1 is applied in a side view.

A system and a method for operation management of a conveyor belt according to an embodiment of the present invention will be described below based on an embodiment illustrated in the drawings.

An embodiment of a system for operation management 1 (hereinafter referred to as a system 1) of a conveyor belt illustrated in FIGS. 1 to 4 is used to determine the operational condition of a conveyor belt 13 installed at a conveyor device 10. The system 1 includes a passive IC tag 2 to be installed at the conveyor belt 13, a detector 7 (7A, 7B, 7C), and a computation device 8 communicably connected to the detector 7 in a wired or wireless manner. In the present embodiment, the computation device 8 is configured to be connected to terminal devices 9 (9*a*, 9*b*, 9*c*, 9*d*) such as computers or smartphones at positions (remote places) away from the installation site of the conveyor device 10 via communication networks such as the Internet.

The conveyor device 10 includes a pair of pulleys 11*a* and 11*b* and a large number of support rollers 12 disposed between the pair of pulleys 11*a* and 11*b*. The conveyor belt 13 is mounted between the pulleys 11*a* and 11*b* and supported by the large number of support rollers 12 between the pulleys 11*a* and 11*b*. The drive pulley 11*a* is rotationally driven, and thus the conveyor belt 13 travels. An arrow L in the drawing indicates a longitudinal direction of the conveyor belt 13, and an arrow W indicates a width direction of the conveyor belt 13.

The conveyor belt 13 is constructed with an upper cover rubber 16, a lower cover rubber 17, and a core layer 14 disposed therebetween integrated by vulcanization bonding. In the present embodiment, the core layer 14 is composed of a large number of steel cords 15 arranged side by side in a width direction W. The conveyor belt 13 is provided with other members as required. The core layer 14 is not limited to one composed of the steel cords 15 and may be composed of canvas. When the core layer 14 is composed of canvas, for example, about four to eight layers of canvases are stacked according to the required performance of the conveyor belt 13.

On a carrier side of the conveyor device 10, the lower cover rubber 17 of the conveyor belt 13 is supported by the support rollers 12, making the conveyor belt 13 a trough shape in which the central portion in the width direction W protrudes downward. A conveyed object C is loaded and placed on the upper surface of the upper cover rubber 16 and then conveyed. On a return side of the conveyor device 10, the upper cover rubber 16 of the conveyor belt 13 is supported by the support rollers 12 in a flat state.

Figure 3:
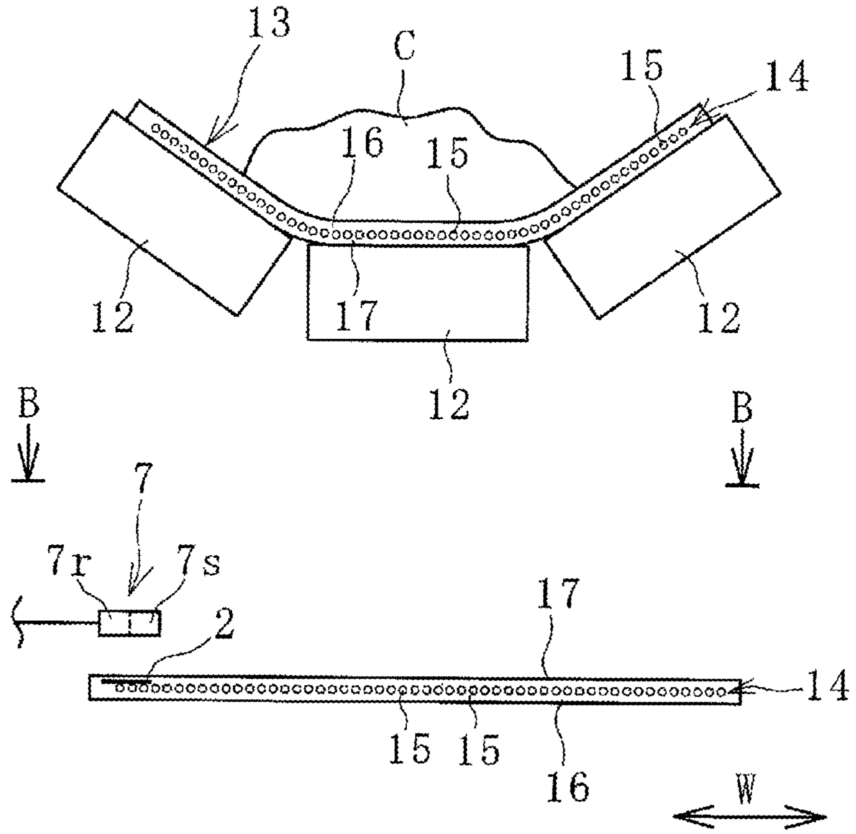
FIG. 3 is a cross-sectional view taken along line A-A of FIG. 2.
Figure 5:
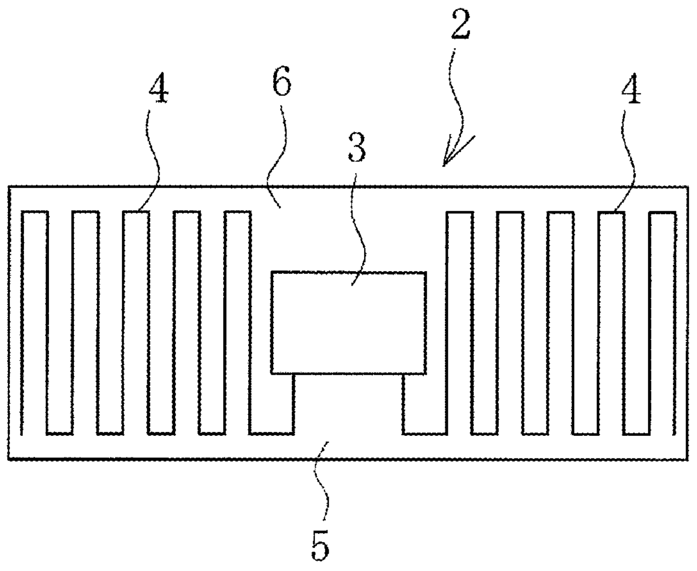
FIG. 5 is an explanatory diagram illustrating an IC tag in a plan view.
Figure 6:
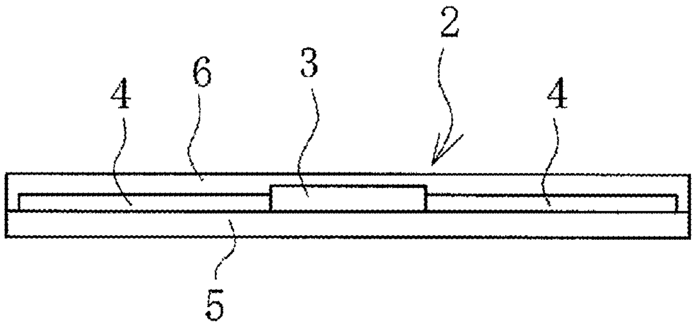
FIG. 6 is an explanatory diagram illustrating the IC tag of FIG. 5 in a cross-sectional view.

As illustrated in FIGS. 5 and 6, the IC tag 2 includes an IC chip 3 and an antenna unit 4 connected to the IC chip 3. The IC chip 3 and the antenna unit 4 are disposed on a substrate 5 and covered with an insulating layer 6. In the present embodiment, the IC tag 2 is embedded in the lower cover rubber 17 as illustrated in FIG. 3. The IC tag 2 may be installed at a different position of the conveyor belt 13. For example, a specification can be adopted in which the IC tag 2 is embedded in the upper cover rubber 16 or, in the case of core layers 14 obtained by stacking a plurality of canvases, the IC tag 2 is embedded between the core layers 14 in which the canvases are stacked adjacent to each other. In order for the IC tag 2 to be protected from the conveyed object C, and the like, the IC tag 2 is preferably embedded in the lower cover rubber 17 or between the core layers 14 rather than in the upper cover rubber 16.

It suffices that a commonly available specification is adopted for the IC tag 2 and that, for example, an RFID tag (general-purpose item) is used. The IC tag 2 has, for example, an area of 200 $mm^2$ or more and 6000 $mm^2$ or less, more preferably 300 $mm^2$ or more and 2700 $mm^2$ or less, and a thickness of 0.01 mm or more and 0.4 mm or less, more preferably 0.03 mm or more and 0.15 mm or less. The heat resistance temperature of the IC tag 2 is, for example, about 250° C.

Unique information for identifying the IC tag 2 from other IC tags 2 can be stored in the IC chip 3. Although other information can be stored in the IC chip 3, it is only required that the unique information on the IC tag 2 be stored in the IC chip 3 in the system 1.

When the conveyor belt 13 is manufactured, a molded product is formed with the IC tag 2 disposed in the unvulcanized lower cover rubber 17 or the unvulcanized upper cover rubber 16 or between the core layers 14 composed of canvases in the molding process. After that, by vulcanizing this molded product, the IC tag 2 is embedded in the conveyor belt 13 in which the core layers 14, the upper cover rubber 16, and the lower cover rubber 17 are integrated. To firmly bond the IC tag 2 to the lower cover rubber 17 or the upper cover rubber 16 in which the IC tag 2 is embedded or the core layers 14, the IC tag 2 may be covered with, for example, a fiber layer soaked with a dipping liquid, and the fiber layer is interposed between the IC tag 2 and an object to be bonded in the molding process of the conveyor belt 13.

A method of installing the IC tag 2 at the conveyor belt 13 is not limited to a method of embedding the IC tag 2 in the conveyor belt 13 at the time of manufacturing the conveyor belt 13 as described above, but the IC tag 2 can also be installed at the conveyor belt 13 after manufacture. That is, the IC tag 2 can be retrofitted to the conveyor belt 13. For example, the IC tag 2 is disposed at a desired position (the surface of the lower cover rubber 17 or the upper cover rubber 16) of the manufactured conveyor belt 13. Thereafter, the IC tag 2 is covered with a rubber material, and the IC tag 2 is joined to the conveyor belt 13 together with the rubber material. For this joining, a known adhesive or known vulcanization bonding can be used. When the vulcanization bonding is used, for example, a predetermined position of the conveyor belt 13 is subjected to a known surface treatment such as buffing, and then the IC tag 2 is disposed at the predetermined position and covered with an unvulcanized rubber material. Thereafter, the unvulcanized rubber material is heated and pressurized to be vulcanized, and the IC tag 2 is vulcanization-bonded to the conveyor belt 13 together with the rubber material.

When the method of retrofitting the IC tag 2 to the conveyor belt 13 is adopted, the present invention can be applied to the existing conveyor belt 13. Thus, the IC tag 2 can also be installed at the conveyor belt 13 mounted in the conveyor device 10. The operation of retrofitting the IC tag 2 to the conveyor belt 13 can also be performed at the installation site of the conveyor device 10.

It is only required that at least one IC tag 2 be installed at the conveyor belt 13, but IC tags 2 are preferably installed at a plurality of positions spaced apart in a longitudinal direction L. The IC tags 2 are embedded in the conveyor belt 13, for example, at intervals TL of 5 m or more and 20 m or less in the longitudinal direction L. That is, the installation pitch TL of the IC tags 2 is preferably in the range of 5 m or more and 20 m or less, and is more preferably an equal pitch. The installation pitch TL of the IC tags 2 is suitably about 10 m.

The detector 7 wirelessly communicates with the IC tag 2 installed at the conveyor belt 13 without contacting the conveyor belt 13. The detector 7 includes a transmission unit 7*s* and a reception unit 7*r*. The transmission unit 7*s* transmits a transmission radio wave R1 toward the IC tag 2. The reception unit 7*r* receives a return radio wave R2 returned from the IC tag 2 (antenna unit 4) in response to the transmission radio wave R1, and acquires identification information on the IC tag 2 stored in the IC chip 3 and transmitted together with the return radio wave R2.

As the detector 7, a commonly available specification that enables wireless communication with a passive RFID tag or the like is adopted. In this way, the IC tag 2 and the detector 7 constitute a Radio Frequency Identification (RFID) system. The frequency of radio waves used for wireless communication between the IC tag 2 and the detector 7 is mainly in the UHF band (the range of 860 MHz or more and 930 MHz or less, which depends on the country, and 915 MHz or more and 930 MHz in Japan), and the HF band (13.56 MHz) may be used.

The detector 7 is disposed at a detection position P close to the conveyor belt 13 in the conveyor device 10. The detector 7 is disposed at at least one detection position P. It is preferable that the detector 7 be disposed at every one of a plurality of detection positions P spaced apart in the longitudinal direction L rather than at only one detection position P.

In the present embodiment, the detectors 7 are disposed at the plurality of detection positions P spaced apart in the longitudinal direction L of the conveyor belt 13 mounted between the pulleys 11*a* and 11*b*. For example, each detector 7 is disposed at a corresponding one of the detection positions P at intervals of 10 m or more and 30 m or less in the longitudinal direction L. The detection positions P may be disposed at substantially equal intervals along a predetermined section or the entire circumference of the conveyor belt 13.

The present invention is not limited to a specification in which the detectors 7 are disposed on the return side of the conveyor device 10 as in the present embodiment. A specification can be also adopted in which the detectors 7 are disposed on the carrier side or disposed on the carrier side and the return side. The separation distance between each detector 7 and the antenna unit 4 when they are closest to each other is set within 1 m, for example. That is, each detector 7 is installed at the detection position P where the separation distance between the detector 7 and the antenna unit 4 is 1 m or less when the antenna unit 4 passes near the detector 7.

Figure 4:
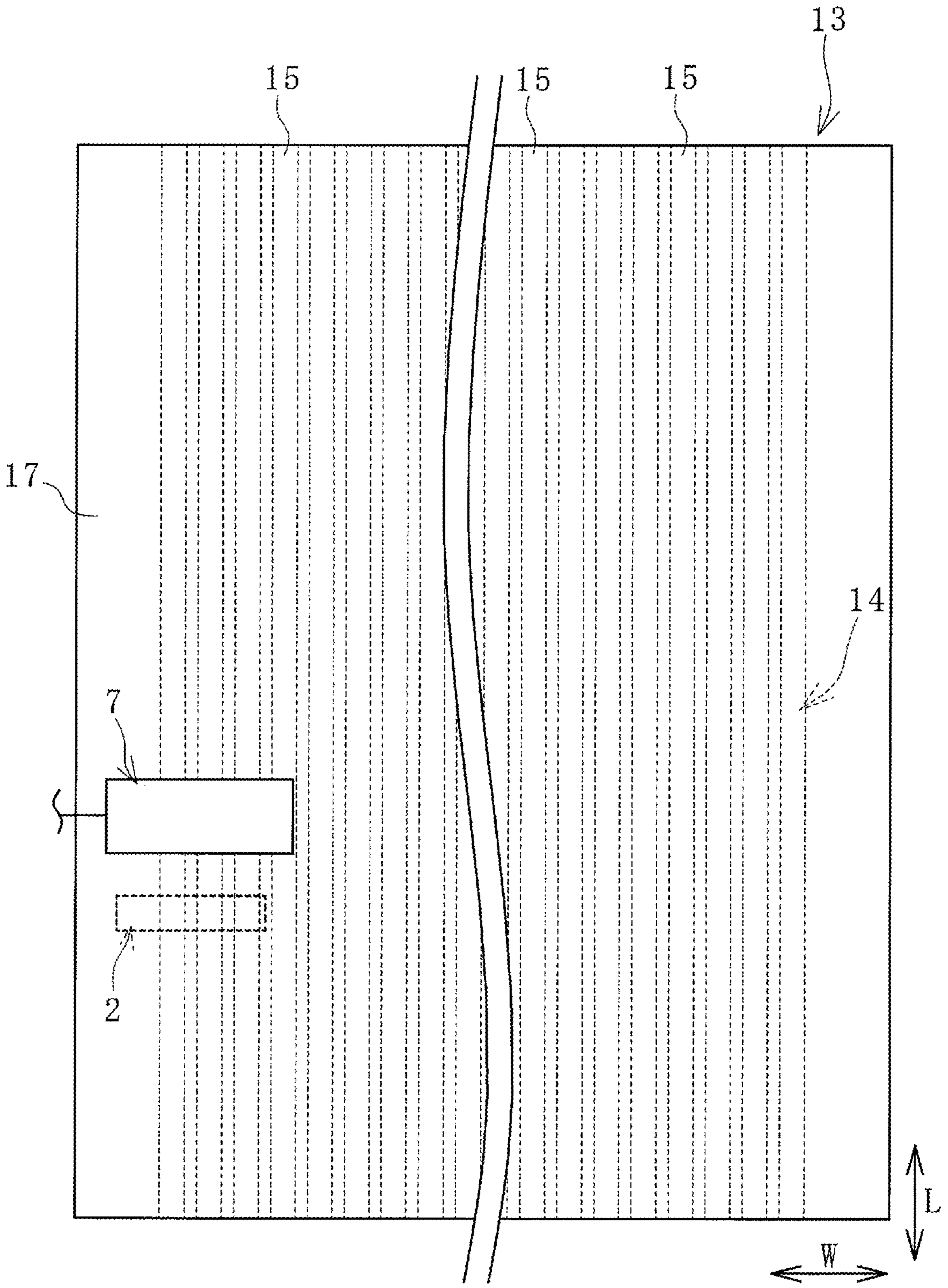
FIG. 4 is a view in the direction of arrow B in FIG. 3.

In the present embodiment, each detector 7 is disposed at one end portion of the conveyor belt 13 in the width direction Was illustrated in FIG. 4. The position of each detector 7 in the width direction preferably matches the position of the IC tag 2 in the width direction of the conveyor belt 13.

The computation device 8 is connected to the detectors 7 in a wired or wireless manner. A computer or a computer server is used as the computation device 8. Information detected and acquired by the detectors 7 is input to the computation device 8. The computation device 8 performs various types of computational processing based on various pieces of input information. As described below, the reception result of the return radio wave R2 is input from each detector 7 to the computation device 8, and a running speed V of the conveyor belt 13 is calculated by the computation device 8 based on reception time t when the return radio wave R2 is received by the detector 7. Then, the operational state of the conveyor belt 13 is determined based on a change over time in the calculated running speed V. In addition, the computation device 8 is connected to desired terminal devices 9 (9*a* to 9*d*) via communication networks such as the Internet, and has a transmission function of transmitting various pieces of information (data) to the terminal devices 9.

Next, an example of a procedure of a method for determining the operational state of the conveyor belt 13 using the system 1 will be described.

Figure 7:
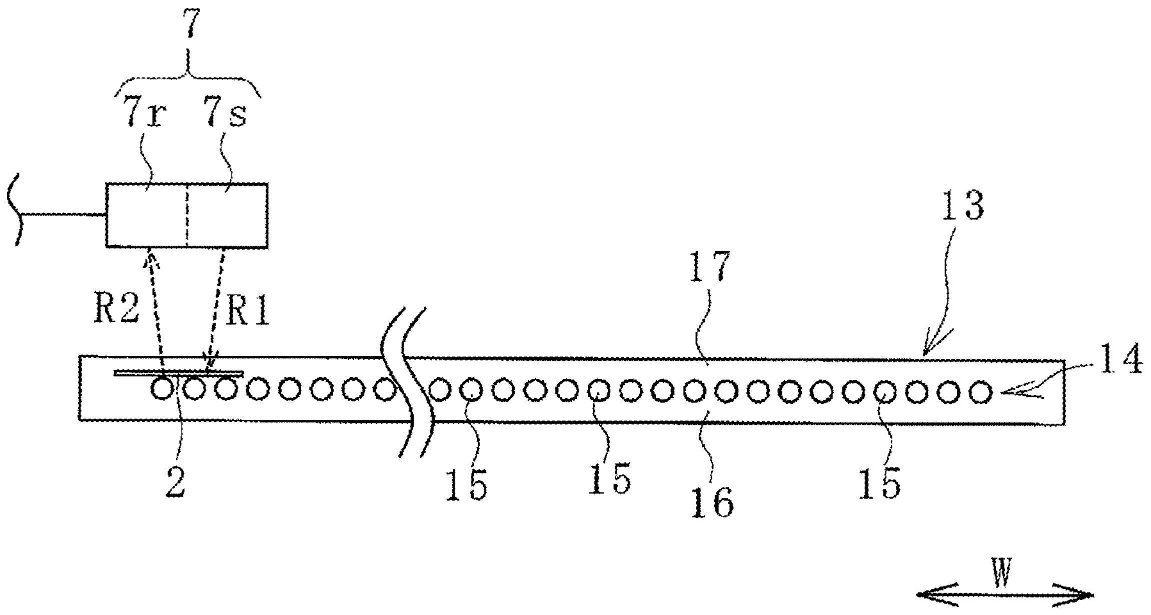
FIG. 7 is an explanatory diagram illustrating a state in which the IC tag and a detector wirelessly communicate with each other in a cross-sectional view of the conveyor belt.

As illustrated in FIG. 7, each detector 7 (transmission unit 7*s*) transmits a transmission radio wave R1 toward the IC tag 2. When approaching each detector 7 through the travel of the conveyor belt 13, a corresponding IC tag 2 receives the transmission radio wave R1 at the antenna unit 4, and the transmission radio wave R1 generates electric power in the IC tag 2 to activate the IC tag 2.

The activated IC tag 2 sequentially returns a return radio wave R2 to the detector 7 in response to the transmission radio wave R1. This return radio wave R2 is returned from the IC tag 2 to the detector 7 through the antenna unit 4. By receiving this return radio wave R2, the detector 7 (reception unit 7*r*) sequentially acquires, as a reception result, identification information on the IC tag 2 stored in the IC chip 3, together with the return radio wave R2.

Here, a method of calculating the running speed V of the conveyor belt 13 by the computation device 8 will be described.

In the present embodiment, the detectors 7 are disposed at the plurality of detection positions P spaced apart in the longitudinal direction L. Thus, when the conveyor belt 13 travels, each detector 7 wirelessly communicates with the IC tag 2 and acquires the identification information on the IC tag 2 when the IC tag 2 passes near the detector 7. The acquired identification information on the IC tag 2 is stored in the computation device 8 together with the reception time t when the detector 7 receives the return radio wave R2 from the IC tag 2. Since a separation distance PL of the detection position P, at which each detector 7 is disposed, in the longitudinal direction L is known in advance, the separation distance PL is input to the computation device 8.

Thus, the computation device 8 calculates the running speed V based on the reception time t of the return radio waves R2 from the identical IC tag 2 by each of the detectors 7 disposed at at least two detection positions P spaced apart in the longitudinal direction L and the separation distance PL between the at least two detection positions P. For example, the separation distance between the detectors 7A and 7B is PL, and when the reception times t of the return radio waves R2 from the identical IC tag 2 by the detectors 7A and 7B are t1 and t2, the time required for the IC tag 2 to move from the detector 7A to the detector 7B is (t2-t1), and thus the running speed V is calculated as V=PL/(t2-t1).

The calculation of the running speed V uses, without limitation, the data from the detectors 7 (the data from the detectors 7A and 7B, the data from the detectors 7B and 7C, and the data from the detectors 7C and 7A) disposed at the detection positions P adjacent to each other in the longitudinal direction L and can use the data from the respective detectors 7 disposed at two detection positions P selected from the detection positions P. Thus, the data of the detectors 7A and 7C may be used. The conveyor belt 13 is continuous, and thus basically, it is only required to calculate the running speed V in one discretionary section (the separation distance PL between two discretionary detection positions P). However, for example, the running speed V may be slightly different between in a section just in front of a position where the conveyed object C is loaded and in a section just behind a position where the conveyed object C is loaded due to the weight of the conveyed object C, the loading impact, and the like. Thus, it is preferable to calculate the running speed V in a plurality of sections. This calculation method only requires that the separation distance PL be known and does not require the position information on the IC tag 2 at the conveyor belt 13, so that the method can be easily applied to any conveyor belt 13.

In addition, it is only required that at least one IC tag 2 be used for the calculation of the running speed V, but when only one IC tag 2 is used and a belt length BL of the conveyor belt 13 is excessively long, the frequency of calculating the running speed V decreases. Moreover, since the IC tag 2 may have a failure, it is preferable to calculate the running speed V by using a plurality of IC tags 2 (respective IC tags 2) installed at the conveyor belt 13.

When the plurality of IC tags 2 are installed at the conveyor belt 13, the running speed V can be calculated by another method. In this calculation method, one detector 7 disposed at the identical detection position P is used, and the installation pitch TL of the IC tags 2 to be used is input to the computation device 8. The one detector 7 disposed at this detection position P receives the return radio waves R2 from the respective IC tags 2 installed at the installation pitch TL. The running speed V is calculated based on the reception time t of the return radio wave R2 from each IC tag 2 by the detector 7 and the installation pitch TL.

For example, when two IC tags 2 are installed at the installation pitch TL and the reception times t of the return radio waves R2 from the respective IC tags 2 by one detector 7 disposed at the identical detection position P are t1 and t2, the time required for the conveyor belt 13 to move the length of the installation pitch TL is (t2-t1), and thus the running speed V is calculated as V=TL/(t2-t1). This calculation method requires that the installation pitch TL of the two IC tags 2 to be used be known. Since the detector 7 may have a failure, the present invention is not limited to use of the detector 7 disposed at one specific detection position P, and it is preferable to calculate the running speed V using the detectors 7 disposed at a plurality of detection positions P (respective detection positions P).

Further, the running speed V can be calculated by another method. In this calculation method, one detector 7 disposed at the identical detection position P sequentially receives the return radio wave R2 from the identical IC tag for one lap of the conveyor belt 13. The running speed V is calculated based on the reception time t when the return radio wave R2 is sequentially received by the detector 7 for one lap of the conveyor belt 13 and based on the belt length BL of the conveyor belt 13. When the detector 7 is disposed at only one detection position P and only one IC tag 2 is installed at the conveyor belt 13, this calculation method is necessarily used.

For example, when the belt length is BL and the reception times of the return radio waves R2 from the identical IC tag 2 sequentially received by the detector 7 disposed at the identical detection position P for one lap of the conveyor belt 13 are t1 and t2, the time required for one revolution of the conveyor belt 13 (movement by the belt length BL) is (t2-t1), so that the running speed V is calculated as V=BL/(t2-t1). This calculation method requires that the belt length BL of the conveyor belt 13 be known. The IC tag 2 may have a failure. Thus, when a plurality of IC tags 2 are installed at the conveyor belt 13, the running speed V is preferably calculated using the plurality of IC tags 2 (the respective IC tags 2).

The running speed V calculated by the computation device 8 reflects the actual operational condition of the conveyor belt 13. That is, it can be determined that the conveyor belt 13 is not operating (not running) when the running speed V is zero (including a case where the running speed V is very close to zero). Although it is very rare, when the conveyor belt 13 stops in a state where a certain IC tag 2 is located at a position close to a certain detection position P (detector 7), the detector 7 continuously receives the return radio wave R2 from the IC tag 2. Thus, when the detector 7 disposed at the identical detection position P continuously receives the return radio wave R2 from the identical IC tag 2, it is also determined that the conveyor belt 13 is not operating.

When the running speed V is substantially constant, it can be determined that the conveyor belt 13 is in steady operation. When the running speed V is uniformly increasing, it can be determined that the conveyor belt 13 is in a starting state, and when the running speed V is uniformly decreasing, it can be determined that the operation is to be stopped.

Figure 8:
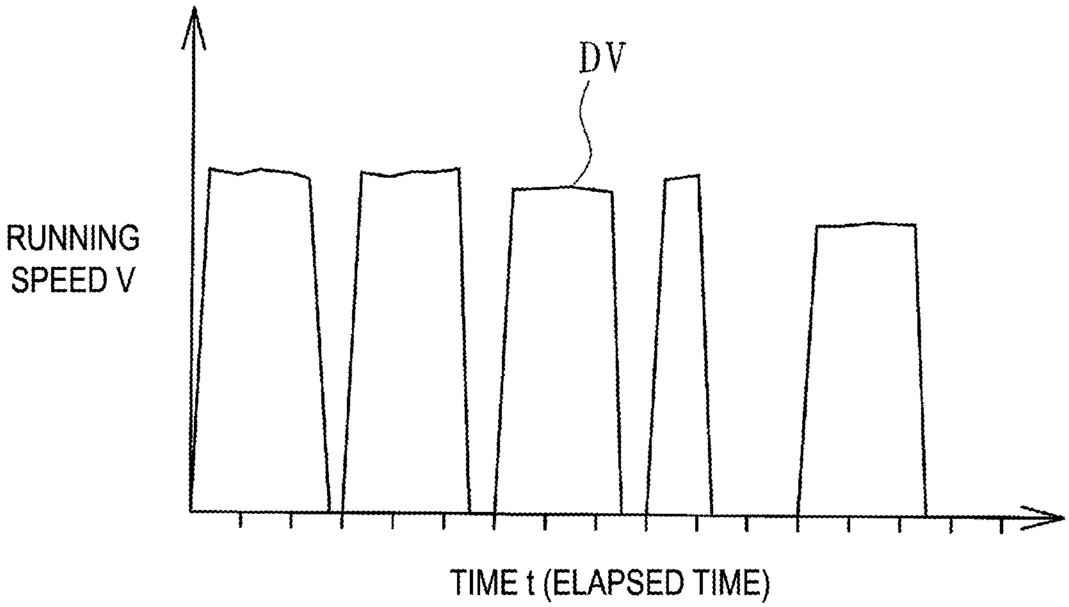
FIG. 8 is a graph schematically illustrating a change over time in the running speed of the conveyor belt.

Thus, as illustrated in FIG. 8, the computation device 8 outputs data DV of a change over time in the running speed V and calculates the cumulative operating time of the conveyor belt 13 based on the data DV. By referring to the data DV of FIG. 8, it is possible to accurately determine the actual operational condition of the conveyor belt 13 (the presence or absence of operation and a change in the running speed V). An actual service life X of the conveyor belt 13 is largely affected by the cumulative operating time rather than by the elapsed time after the conveyor belt 13 is mounted in the conveyor device 10. Thus, the actual operating time (cumulative operating time) of the conveyor belt 13 is determined using the data DV, which is advantageous in accurate determination of the actual service life X of the conveyor belt 13.

By using the data DV of a large number of conveyor belts 13 having the same specification to determine the correlation between the cumulative operating time and the actual service life X of each conveyor belt, the actual service life X of each conveyor belt 13 having the specification can be accurately estimated. Thus, the data DV of the conveyor belt 13 having the same specification as that of the conveyor belt used on the site of use is determined, and the current cumulative operating time is calculated by the computation device 8. Then, by subtracting the current cumulative operating time from the service life X estimated in advance as described above, the remaining service life of the conveyor belt 13 can be accurately calculated by the computation device 8. The remaining service life can be accurately calculated, which is advantageous in replacement of the conveyor belt 13 at a proper timing suitable for each site of use.

The cumulative travel distance of the conveyor belt 13 also largely affects the actual service life X of the conveyor belt 13. Thus, the cumulative travel distance can be used as an index for estimating the actual service life X. The cumulative travel distance can be calculated by time integration of the data DV by the computation device 8. By using the data DV of a large number of conveyor belts 13 having the same specification to determine the correlation between the cumulative travel distance of each conveyor belt and the cumulative travel distance when the actual service life X has been reached, it is possible to accurately estimate the cumulative travel distance corresponding to the actual service life X of the conveyor belt 13 having the specification. Thus, the data DV of the conveyor belt 13 having the same specification as that of the conveyor belt used on the site of use is determined, and the current cumulative travel distance is calculated by the computation device 8. Then, by subtracting the current cumulative travel distance from the cumulative travel distance corresponding to the service life X estimated in advance as described above, the remaining cumulative travel distance corresponding to the remaining service life of the conveyor belt 13 can be accurately calculated by the computation device 8.

Various other analyses can be performed on the operational state of the conveyor belt 13 using the data DV. For example, when the running driving force of the conveyor belt 13 (the rotational driving torque of the pulley 11*a*) is the same, the running speed V decreases as the loading amount of the conveyed object C increases. Thus, it is preferable to input data of the rotational driving torque of the pulley 11*a* to the computation device 8. Thus, based on the data of the rotational driving torque of the pulley 11*a* and the data of the running speed V, the computation device 8 can determine the appropriateness of the loading amount of the conveyed object C. For example, when the running speed V is lower than a permissible range even though the data of the rotational driving torque of the pulley 11*a* has a normal value, it can be determined that the loading amount is excessively large, and when the running speed V is higher than the permissible range, it can be determined that the loading amount is excessively small.

In this system 1, when the return radio wave R2 only from a specific IC tag 2 is not received by the detector 7, the IC tag 2 may have a failure, and thus the presence or absence of a failure is checked by timely inspection. Further, when the return radio wave R2 from the IC tag 2 is not received only by a specific detector 7, the detector 7 may have a failure, and thus the presence or absence of a failure is checked by timely inspection. From the viewpoint of discovering failures of the IC tag 2 and the detector 7, the system 1 preferably includes a plurality of IC tags 2 and a plurality of detectors 7.

In this system 1, the above-described IC tag 2, detector 7, and computation device 8 are used, and the IC tag 2 is a general-purpose product capable of returning the return radio wave R2 to the detector 7 in response to the transmission radio wave R1 transmitted from the detector 7. Thus, the entire configuration of the system 1 is simple and highly versatile, which is also advantageous in reduction of the equipment costs. Thus, the system 1 is advantageous in determination of the operational conditions of the conveyor belts 13 on various sites of use.

In the present embodiment, the computation device 8 transmits the data DV to the terminal devices 9 located remote from the installation site of the conveyor device 10 through the communication networks. For example, the data DV and the calculated cumulative operating time are transmitted to the terminal devices 9 of related people such as a management room of an operating company (user) of the conveyor belt 13, a sales company of the conveyor belt 13, a manufacturing company of the conveyor belt 13, and the like, which are located at places remote from the installation site of the conveyor device 10. As a result, the related people can determine the operational condition of the conveyor belt 13 substantially in real time while being at places remote from the place where the conveyor belt 13 is used.

In addition, the calculated remaining service life of the conveyor belt 13 and the estimated replacement time are preferably transmitted to the terminal devices 9, and various pieces of data and information described above can also be transmitted to the terminal devices 9. Note that a configuration may be adopted in which data and information to be transmitted to each terminal device 9 can be set for each terminal device 9, and the types of the data and information to be transmitted to each terminal device 9 are discretionarily limited.

It is necessary to increase the frequency of communication between the IC tag 2 and the detector 7 in order to prevent loss of communication therebetween. For example, setting the frequency of communication between the IC tag 2 and the detector 7 to 3 to 10 times/second avoids a problem in that the detector 7 cannot receive the return radio wave R2 from the IC tag 2 (loss of communication) even when the running speed V is high. On the other hand, increasing the frequency of communication causes, when the IC tag 2 passes through the detection position P, wireless communication between the detector 7 disposed at the detection position P and the IC tag 2 to be performed multiple times while the IC tag passes once. That is, when the identical IC tag 2 passes through each of the detection positions P, the detector 7 disposed at the detection position P receives the return radio wave R2 from the identical IC tag 2 multiple times while the IC tag passes once.

Figure 9:
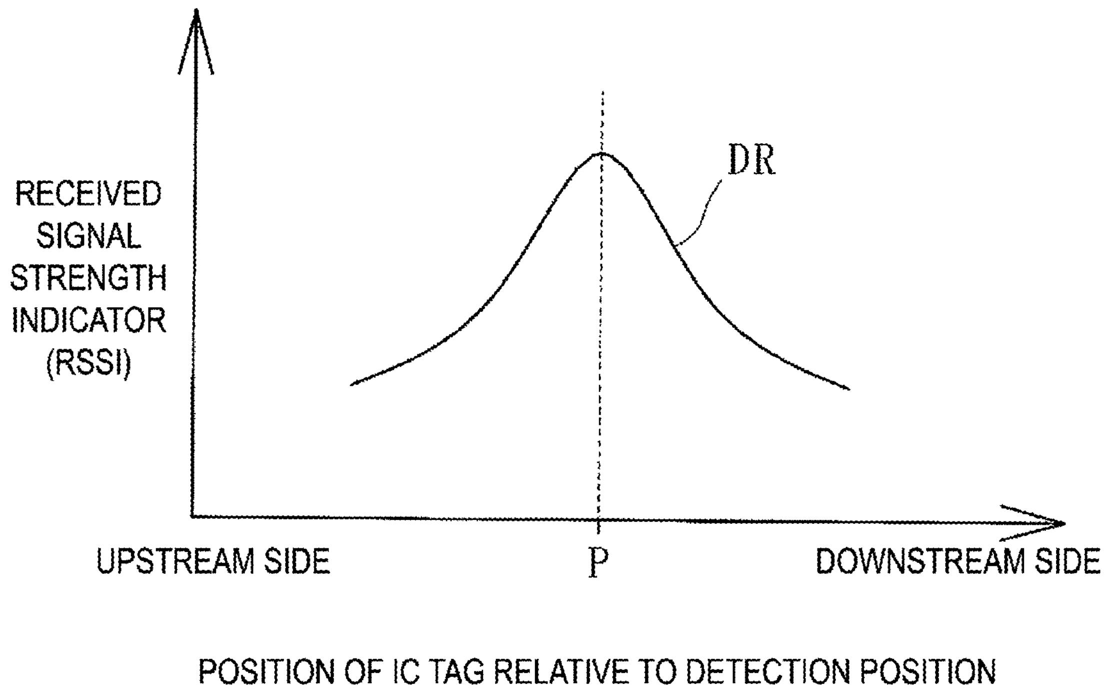
FIG. 9 is a graph schematically illustrating the relationship between the position of the IC tag relative to a detection position and the received signal strength indicator of a return radio wave at the detector disposed at the detection position.

When the conveyor belt 13 travels and thus the IC tag 2 moves toward the detection position P where the detector 7 is disposed, the received signal strength indicator RSSI of the return radio wave R2 received by the detector 7 increases as the IC tag 2 and the detector 7 located at the detection position P wirelessly communicate with each other at a position closer to the detection position P, like data DR illustrated in FIG. 9. That is, it is conceivable that when the received signal strength indicator RSSI of the return radio wave R2 is highest, the IC tag 2 is at a position closest to the detection position P.

Thus, if the detector 7 disposed at the detection position P receives, when the identical IC tag 2 passes through the detection position P, the return radio waves R2 from the IC tag 2 multiple times while the IC tag passes once, time of receiving the return radio wave R2 having the highest received signal strength indicator RSSI of the return radio waves R2 received multiple times is adopted as the reception time t by the detector 7 disposed at the detection position P. The use of the reception time t adopted in this way is advantageous in accurate calculation of the running speed V.

REFERENCE SIGNS LIST

1 Operation management system
2 IC tag
3 IC chip
4 Antenna unit
5 Substrate
6 Insulating layer
7 (7A, 7B, 7C) Detector
7*s* Transmission unit
7*r* Reception unit

8 Computation device
9 (9*a*. 9*b*. 9*c*. 9*d*) Terminal device
10 Conveyor device
11*a*. 11*b* Pulley
12 Support roller
13 Conveyor belt
14 Core layer
15 Steel cord
16 Upper cover rubber
17 Lower cover rubber
C Conveyed object

The invention claimed is:

1. A system for operation management of a conveyor belt, the system comprising:

an IC tag of a passive type to be installed at a conveyor belt;

at least two detectors configured to wirelessly communicate with the IC tag without contacting the conveyor belt and disposed at at least two detection positions of the conveyor device; and a computation device communicably connected to the detectors;

the at least two detectors receiving return radio waves returned from the IC tag installed at the conveyor belt mounted in a conveyor device in response to transmission radio waves transmitted from the detectors toward the IC tag, the computation device calculating a running speed of the conveyor belt based on reception times of the return radio waves by the at least two detectors, an operational state of the conveyor belt being determined based on a change over time in the running speed calculated, the at least two detectors disposed at the at least two detection positions being spaced apart in a longitudinal direction of the conveyor belt and each of the detectors receives the return radio wave from the IC tag that is identical, the running speed is calculated based on the reception times of the return radio waves by the at least two detectors and a separation distance between the at least two detection positions in the longitudinal direction of the conveyor belt, and wherein if one detector of the at least two detectors disposed at one detection position of the at least two detection positions receives, when the IC tag that is identical passes through the one detection position, the return radio wave from the IC tag that is identical multiple times while the IC tag passes once, time of receiving the return radio wave having a highest received signal strength indicator of the return radio waves received multiple times is adopted as the reception time by the one detector disposed at the one detection position.

2. The system for operation management of a conveyor belt according to claim 1, wherein data of the change over time in the running speed is transmitted to a terminal device at a position away from an installation site of the conveyor device through a communication network.

3. A system for operation management of a conveyor belt, the system comprising:

a plurality of IC tags of a passive type to be installed at a conveyor belt;

a detector configured to wirelessly communicate with the IC tags without contacting the conveyor belt; and a computation device communicably connected to the detector;

the detector receiving return radio waves returned from the IC tags installed at the conveyor belt mounted in a conveyor device in response to transmission radio waves transmitted from the detector toward the IC tags, the computation device calculating a running speed of the conveyor belt based on reception times of the return radio waves by the detector disposed at at least one detection position of the conveyor device, an operational state of the conveyor belt being determined based on a change over time in the running speed calculated, the detector disposed at the detection position that is identical receives the return radio waves from a plurality of the IC tags each disposed at positions spaced apart in a longitudinal direction of the conveyor belt, the running speed is calculated based on the reception time of the return radio wave from each of the IC tags by the detector and a separation distance between the IC tags in the longitudinal direction of the conveyor belt, and wherein if the detector disposed at the detection position receives, when the IC tag that is identical passes through a detection position of the detector, the return radio wave from the IC tag that is identical multiple times while the IC tag passes once, time of receiving the return radio wave having a highest received signal strength indicator of the return radio waves received multiple times is adopted as the reception time by the detector disposed at the detection position.

4. The system for operation management of a conveyor belt according to claim 3, wherein data of the change over time in the running speed is transmitted to a terminal device at a position away from an installation site of the conveyor device through a communication network.

5. A system for operation management of a conveyor belt, the system comprising:

an IC tag of a passive type to be installed at a conveyor belt;

a detector configured to wirelessly communicate with the IC tag without contacting the conveyor belt; and a computation device communicably connected to the detector;

the detector receiving return radio wave returned from the IC tag installed at the conveyor belt mounted in a conveyor device in response to a transmission radio wave transmitted from the detector toward the IC tag, the computation device calculating a running speed of the conveyor belt based on reception time of the return radio wave by the detector disposed at at least one detection position of the conveyor device, an operational state of the conveyor belt being determined based on a change over time in the running speed calculated, the detector disposed at the detection position that is identical sequentially receives the return radio wave from the IC tag that is identical every time the conveyor belt laps, and the running speed is calculated based on reception time of the return radio wave sequentially received by the detector and a belt length of the conveyor belt, and wherein if the detector disposed at the detection position receives, when the IC tag that is identical passes through a detection position of the detector, the return radio wave from the IC tag that is identical multiple times while the IC tag passes once, time of receiving the return radio wave having a highest received signal strength indicator of the return radio waves received multiple times is adopted as the reception time by the detector disposed at the detection position.

6. The system for operation management of a conveyor belt according to claim 5, wherein data of the change over time in the running speed is transmitted to a terminal device at a position away from an installation site of the conveyor device through a communication network.

* * * * *